United States Patent
Goering et al.

(10) Patent No.: US 9,133,965 B2
(45) Date of Patent: Sep. 15, 2015

(54) TEMPERATURE-CONTROLLABLE PIPE SUITABLE FOR OFFSHORE APPLICATIONS

(75) Inventors: Rainer Goering, Borken (DE); Andreas Dowe, Borken (DE); Karl Kuhmann, Duelmen (DE); Maximilian Gruhn, Marl (DE); Juergen Franosch, Marl (DE)

(73) Assignee: Evonik Degussa GmbH, Essen (DE)

( * ) Notice: Subject to any disclaimer, the term of this patent is extended or adjusted under 35 U.S.C. 154(b) by 270 days.

(21) Appl. No.: 13/463,061

(22) Filed: May 3, 2012

(65) Prior Publication Data

US 2012/0279577 A1    Nov. 8, 2012

(30) Foreign Application Priority Data

May 6, 2011    (DE) .......................... 10 2011 075 383

(51) Int. Cl.

| | | |
|---|---|---|
| A47J 31/00 | (2006.01) | |
| F24H 1/10 | (2006.01) | |
| F16L 11/24 | (2006.01) | |
| F16L 11/08 | (2006.01) | |
| F16L 53/00 | (2006.01) | |
| E21B 17/01 | (2006.01) | |
| H05B 3/48 | (2006.01) | |

(52) U.S. Cl.
CPC ............. *F16L 11/24* (2013.01); *E21B 17/015* (2013.01); *F16L 11/083* (2013.01); *F16L 53/008* (2013.01); *H05B 3/48* (2013.01); *H05B 2203/021* (2013.01); *H05B 2214/03* (2013.01); *H05B 2214/04* (2013.01); *Y10T 137/0391* (2015.04)

(58) Field of Classification Search
None
See application file for complete search history.

(56) References Cited

U.S. PATENT DOCUMENTS

| | | |
|---|---|---|
| 4,286,376 A | 9/1981 | Smith-Johannsen et al. |
| 4,874,925 A | 10/1989 | Dickenson |
| 4,921,018 A | 5/1990 | Dridi et al. |
| 5,307,842 A | 5/1994 | Lequeux |

(Continued)

FOREIGN PATENT DOCUMENTS

| | | |
|---|---|---|
| EP | 0 312 204 A2 | 4/1989 |
| EP | 0 312 204 A3 | 4/1989 |

(Continued)

OTHER PUBLICATIONS

U.S. Appl. No. 13/892,534, filed May 13, 2013, Goering, et al.

(Continued)

*Primary Examiner* — Thor Campbell
(74) *Attorney, Agent, or Firm* — Oblon, McClelland, Maier & Neustadt, L.L.P.

(57) ABSTRACT

A flexible pipe which can be heated efficiently, and may therefore be used for conveying oil in cold regions, is provided. The pipe comprises in order from inside to outside: an interior lining; a wound tape; and at least one reinforcement layer. The wound tape contains a first exterior layer of a plastics molding composition that is not electrically conductive; an intermediate layer of an electrically conductive plastics molding composition; and a second exterior layer of a plastics molding composition that is not electrically conductive. A volume resistivity to IEC 60093 of the intermediate layer is in the range from $10^{-3}$ to $10^{10}$ Ωm, and the intermediate layer comprises at least two metallic conductors embedded into the plastic molding composition along an entire length of the tape in such a way that, the two conductors do not touch one another.

20 Claims, 3 Drawing Sheets

(56) References Cited

U.S. PATENT DOCUMENTS

| | | |
|---|---|---|
| 5,428,706 A | 6/1995 | Lequeux |
| 6,085,799 A | 7/2000 | Kodaissi et al. |
| 6,090,459 A | 7/2000 | Jadamus et al. |
| 6,102,077 A | 8/2000 | Legallais et al. |
| 6,123,114 A | 9/2000 | Seguin et al. |
| 6,227,250 B1 | 5/2001 | Coutarel |
| 6,283,160 B1 | 9/2001 | Hardy et al. |
| 6,316,537 B1 | 11/2001 | Baumann et al. |
| 6,656,997 B2 | 12/2003 | Baumann et al. |
| 8,574,697 B2 | 11/2013 | Dowe et al. |
| 8,679,270 B2 | 3/2014 | Dowe et al. |
| 8,697,814 B2 | 4/2014 | Dowe et al. |
| 2002/0100516 A1 | 8/2002 | Powell et al. |
| 2006/0182916 A1 | 8/2006 | Dowe et al. |
| 2006/0183869 A1 | 8/2006 | Dowe et al. |
| 2008/0202616 A1 | 8/2008 | Bergere et al. |
| 2010/0009106 A1 | 1/2010 | Dowe et al. |
| 2010/0300572 A1 | 12/2010 | Dowe et al. |
| 2010/0300573 A1 | 12/2010 | Dowe et al. |
| 2011/0209768 A1 | 9/2011 | Dowe et al. |
| 2011/0226754 A1 | 9/2011 | Malone et al. |
| 2012/0000541 A1 | 1/2012 | Dowe et al. |
| 2012/0006465 A1 | 1/2012 | Dowe et al. |
| 2012/0199317 A1 | 8/2012 | Hartmann et al. |
| 2012/0275774 A1 | 11/2012 | Goering et al. |
| 2013/0025734 A1 | 1/2013 | Kuhmann et al. |
| 2013/0025735 A1 | 1/2013 | Kuhmann et al. |
| 2013/0032239 A1 | 2/2013 | Kuhmann et al. |
| 2013/0032240 A1 | 2/2013 | Kuhmann et al. |
| 2013/0171388 A1 | 7/2013 | Pawlik et al. |

FOREIGN PATENT DOCUMENTS

| | | |
|---|---|---|
| GB | 2 065 430 A | 6/1981 |
| WO | WO 85/04941 | 11/1985 |
| WO | WO 91/18231 | 11/1991 |
| WO | WO 92/11487 | 7/1992 |
| WO | WO 97/20162 | 6/1997 |
| WO | WO 00/66934 | 11/2000 |
| WO | WO 00/66935 | 11/2000 |
| WO | WO 01/07824 | 2/2001 |
| WO | WO 01/61232 | 8/2001 |
| WO | WO 2006/090182 | 8/2006 |
| WO | WO 2006/097765 | 9/2006 |
| WO | WO 2008/005829 | 1/2008 |
| WO | WO 2010/032017 A1 | 3/2010 |
| WO | WO 2010/032017 A9 | 3/2010 |

OTHER PUBLICATIONS

European Search Report issued Dec. 4, 2013, in European Patent Application No. 12165148.3.
U.S. Appl. No. 14/224,807, filed Mar. 25, 2014, Franosch, et al.
U.S. Appl. No. 14/225,842, filed Mar. 26, 2014, Dowe, et al.
"Recommended Practice for Flexible Pipe"; API Recommended Practice 17B, 2002, $3^{rd}$ Edition, pp. 1-152.
"Specification for Unbonded Flexible Pipe"; API Specification 17J, 1999, $2^{nd}$ Edition, pp. 1-45.

TEMPERATURE-CONTROLLABLE PIPE SUITABLE FOR OFFSHORE APPLICATIONS

CROSS REFERENCE TO RELATED APPLICATIONS

This application claims priority to German Application No. 102011075383.4, filed May 6, 2011, the disclosure of which is incorporated herein by reference in its entirety.

BACKGROUND OF THE INVENTION

Field of the Invention

The present invention relates to a temperature-controllable, flexible pipe of multilayer structure with unbonded layers. For simplicity, the term unbonded flexible pipe is used hereinafter for this type of pipe. It has high resistance to the diffusion of gases from a conveyed fluid, and can therefore be used for conveying liquid or gaseous media, and can be used with particular advantage for conveying crude oil or natural gas.

Unbonded flexible pipes per se are conventionally known. Pipes of this type comprise an interior lining, usually in the form of a plastics pipe, as barrier to the escape of the conveyed fluid, and also comprise one or more reinforcement layers on the external side of the interior lining. The conventional unbonded flexible pipe can comprise additional layers, for example one or more reinforcement layers on the internal side of the interior lining, in order to prevent collapse of the interior lining under high external pressure. This type of interior reinforcement is usually termed a carcass. An exterior sheath may moreover be present, in order to provide a barrier to ingress of liquid from the exterior environment into the reinforcement layers or other inner polymeric or metallic functional layers. In many instances, a thermoplastics layer, for example in the form of wound "anti-wear tapes", is introduced between the exterior reinforcement layers in order to prevent abrasion on the metal structure due to friction.

Typical unbonded flexible pipes have been described by way of example in WO 01/61232, U.S. Pat. No. 6,123,114 and U.S. Pat. No. 6,085,799; they have moreover been characterized in more detail in API Recommended Practice 17B "Recommended Practice for Flexible Pipe", 3rd Edition, March 2002, and in API Specification 17J "Specification for Unbonded Flexible Pipe" 2nd Edition, November 1999.

The term "unbonded" means in this context that at least two of the layers, inclusive of reinforcement layers and plastics layers, have been designed without bonding to one another. The pipe can therefore be bent, and is flexible enough to be rolled up for transport purposes.

Unbonded flexible pipes of this type are used in various embodiments in offshore applications and in various onshore applications for the transport of liquids, gases and slurries. For example, they can be used for the transport of fluids where very high or very different water pressure prevails over the length of the pipe, for example taking the form of risers which run from the ocean floor up to equipment at or in the vicinity of the ocean surface, and they can also generally be used as pipes for the transport of liquids or gases between various items of equipment, or as pipes laid at great depth on the ocean floor, or as pipes between items of equipment close to the ocean surface.

The reinforcement layer(s) in conventional flexible pipes is/are mostly composed of helically arranged steel wires, steel profiles, or steel tapes, where the individual layers can have been formed with various winding angles relative to the axis of the pipe.

In conventional flexible pipes, the interior lining is usually composed of a polyolefin, such as polyethylene, which may also have been crosslinked, of a polyamide, such as PA11 or PA12, or of polyvinylidene fluoride (PVDF). Single- or multilayer linings optionally comprising layers made of other materials are conventionally utilized.

At temperatures below about 40° C., some constituents can precipitate out from crude oil. Particular importance is attached here to precipitation of waxes and sometimes of hydrates, and these can reduce the cross-sectional area of the pipe. The pipes here should be heatable in order to inhibit this phenomenon and in order to provide the transport function even when temperatures are low. There are various ways of heating pipes of this type.

WO 91/18231 describes a heatable flexible pipe system which comprises electrically conductive cables which have been connected to an electrically conductive source of current and generate heat by the principle of resistance heating. Disadvantages of this concept are complicated design and irregularity of temperature control over the entire length.

WO 97/20162 moreover describes a flexible pipe system where a flexible interior pipe is surrounded by a plurality of smaller pipes. These can be utilized for the transport of process media or current. Another conceivable method for temperature-control of the pipe system would use passage of a temperature-controlled medium. The disadvantages of this concept are likewise complicated design, heat losses, and irregular temperature-control over the entire length.

Other applications (WO 92/11487, WO 85/04941, WO 2000/66934, WO 2000/66935 and WO 2001/07824) concern the topic of thermal insulation as a passive method of stabilization of the temperature of the media. However, a problem here is the compressibility of the foamed structures often used. This can reduce the insulation effect at large depths under water and at the high external pressures associated therewith.

WO 2006/097765, WO 2006/090182, US 2008202616 and U.S. Pat. No. 4,874,925 describe another heating method. This involves a multilayer pipe in which for example, two conductors are present, embedded in a conductive layer and displaced by 180° with respect to one another along the pipe. Current flowing from one conductor to the other causes heating within the conductive layer. An important factor for uniform heating is connection to, or uniform contact of the conductor with, the conductive layer. The conductive layer has external thermal and optionally electrical insulation. An advisable or necessary feature is an additional layer inside towards the crude oil, for electrical insulation.

WO 2008/005829 describes heatable pipes in the automobile sector, where these can comprise an electrically conductive polymer layer; this layer acts as a resistance heating system.

SUMMARY OF THE INVENTION

The object of the invention is to provide a flexible pipe of multilayer structure in which the conveyed medium may be electrically heated, while the structure is not significantly more expensive. It should be possible to heat the pipe in a targeted manner only in the pipe sections where heating is specifically required.

This and other objects have been achieved by the present invention, the first embodiment of which provides a flexible pipe comprising, in order from inside to outside: an interior lining; a wound tape, which comprises: a first exterior layer of a plastics molding composition that is not electrically conductive; an intermediate layer of an electrically conductive plastics molding composition; a second exterior layer of a plastics molding composition that is not electrically conductive; and at least one reinforcement layer; wherein a volume resistivity to IEC 60093 of the intermediate layer is in the range from $10^{-3}$ to $10^{10}$ Ωm, and the intermediate layer comprises at least two metallic conductors embedded into the plastic molding composition along an entire length of the tape in such a way that, the two conductors do not touch one another.

In a second embodiment, the intermediate layer of the wound tape comprises at least one polymer selected from the group consisting of an olefinic polymer, a polyamide, a fluoropolymer, a polyethylene 2,6-naphthalate, a polybutylene 2,6-naphthalate, a polyphenyl sulphone, a polyarylene ether ketone, a polyphenylene sulphide, and a blend of a polyarylene ether ketone and a polyphenylene sulphide.

In a third embodiment, an interface between the wound tape and the at least one reinforcement layer is free of bonding.

In a fourth embodiment, the electrically conductive plastics molding composition of the intermediate layer comprises at least one conductive material selected from the group consisting of conductive carbon black, graphite powder and graphite fibrils.

In another embodiment, the present invention provides a method to convey crude oil, comprising: conveying the crude oil through the flexible pipe according to the present invention; and optionally conducting electrical current to the two metallic conductors to heat the crude oil.

DETAILED DESCRIPTION OF THE PREFERRED EMBODIMENTS

Figure 1:
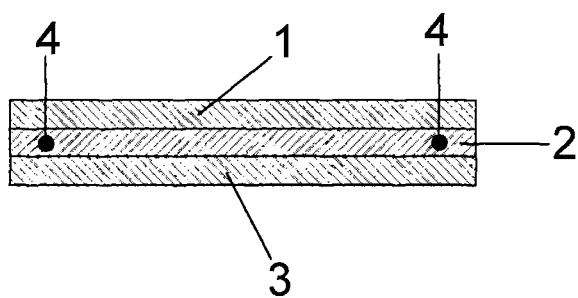
FIG. 1 shows an arrangement of the wound tape according to one embodiment of the invention.

According to the first embodiment, the present invention provides a flexible pipe comprising, in order from inside to outside: an interior lining; a wound tape, which comprises: a first exterior layer of a plastics molding composition that is not electrically conductive; an intermediate layer of an electrically conductive plastics molding composition; a second exterior layer of a plastics molding composition that is not electrically conductive; and at least one reinforcement layer; wherein a volume resistivity to IEC 60093 of the intermediate layer is in the range from $10^{-3}$ to $10^{10}$ Ωm, and the intermediate layer comprises at least two metallic conductors embedded into the plastic molding composition along an entire length of the tape in such a way that, the two conductors do not touch one another.

The volume resistivity of the intermediate layer may preferably be in the range from $10^{-2}$ to $10^{8}$ Ωm, particularly preferably in the range from $10^{-1}$ to $10^{7}$ Ωm and with particular preference in the range from $10^{0}$ to $10^{6}$ Ωm.

The interior lining may be a plastics pipe which provides a barrier to escape of the fluid conveyed. This pipe may, depending on performance requirements, comprise a single layer or else may be composed of a plurality of layers made of different molding compositions. For example, the interior pipe may be a two-layer, three-layer, or four-layer system, or else in particular instances the pipe may of even more layers. Such linings are conventionally known. In another embodiment, the interior lining may be a corrugated, thin-walled metal pipe.

The reinforcement layer or layers is/are conventionally composed of helically arranged steel wires, steel profiles or steel tapes. The design of the reinforcement layers is known to one of ordinary skill in the art. It may be preferable that the structure of at least one of these reinforcement layers is such that it withstands the internal pressure, and that the structure of at least one other of these reinforcement layers is such that it withstands tensile forces. There are usually more than two reinforcement layers present. Adjacent to the reinforcement layers in most cases there may be an exterior sheath, usually in the form of a pipe or flexible tube made of a thermoplastic moulding composition or made of an elastomer.

In one preferred embodiment, a carcass may be present on the interior side of the interior lining of the unbonded flexible pipe. Such carcasses and the design thereof are conventionally known. According to the invention, the unbonded flexible pipe may comprise no carcass, especially when the flexible pipe is not intended for operation under high external pressures.

Suitable materials for the electrically conductive plastics molding composition and for the two plastics moulding compositions which are not electrically conductive are, independently of one another, molding compositions containing olefinic polymers, polyamides, fluoropolymers, polyethylene 2,6-naphthalate, polybutylene 2,6-naphthalate, polyphenyl sulphone, polyarylene ether ketone, polyphenylene sulphide, or a polyarylene ether ketone/polyphenylene sulphide blend.

The olefinic polymer may preferably be a polyethylene, in particular a high-density polyethylene (HDPE), or an isotactic or syndiotactic polypropylene. The polypropylene may be a homo- or copolymer, for example with ethylene or 1-butene as comonomer, and it is possible here to use either random or block copolymers. The polypropylene may optionally be impact-modified, for example with ethylene-propylene rubber (EPM) or EPDM. The syndiotactic polystyrene that may also be used according to the invention may be produced in by metallocene-catalysed polymerization of styrene.

The polyamide may be produced from a combination of diamine and dicarboxylic acid, from an ω-aminocarboxylic acid, or from the corresponding lactam. In principle it may be possible to use any polyamide, for example PA6 or PA66. In one preferred embodiment, the monomer units of the polyamide comprise on average at least 8, at least 9 or at least 10 carbon atoms. In the case of mixtures of lactams, the arithmetic average is considered according to these guidelines. In the case of a combination of diamine and dicarboxylic acid, the arithmetic average of the number of carbon atoms of diamine and dicarboxylic acid in this preferred embodiment must be at least 8, preferably at least 9 and most preferably at least 10. Examples of suitable polyamides are: PA610 (which can be produced from hexamethylenediamine [6 carbon atoms] and sebacic acid [10 carbon atoms], the average number of carbon atoms in the monomer units here therefore being 8), PA88 (which can be produced from octamethylenediamine and 1,8-octanedioic acid), PA8 (which can be produced from caprylolactam), PA612, PA810, PA108, PA9, PA613, PA614, PA812, PA128, PA1010, PA10, PA814, PA148, PA1012, PA11, PA1014, PA1212 and PA12. The production of the polyamides is conventionally known. It may also be possible, to use copolyamides based on these materials, and it is also optionally possible here to make concomitant use of monomers such as caprolactam.

Advantageously, it may also be possible to use, as polyamide, a semiaromatic polyamide in which from 5 to 100 mol % of the dicarboxylic acid content derives from aromatic dicarboxylic acid having from 8 to 22 carbon atoms and which has a crystallite melting point $T_m$ of at least 260° C., preferably of at least 270° C. and particularly preferably of at least 280° C. These polyamides are usually termed PPA. They can be produced from a combination of diamine and dicarboxylic acid, optionally with addition of an ω-amino-carboxylic acid or of the corresponding lactam. Examples of suitable types are PA66/6T, PA6/6T, PA6T/MPMDT (MPMD stands for 2-methylpentamethylenediamine), PA8T, PA10T, PA11T, PA12T, PA14T and also copolycondensates of these last types with an aliphatic diamine and with an aliphatic dicarboxylic acid or with an ω-aminocarboxylic acid or, respectively, a lactam.

The polyamide molding composition may further comprise additional components, e.g. impact modifiers, other thermoplastics, plasticizers and other conventional additives. The only requirement is that the polyamide forms the matrix of the molding composition.

The fluoropolymer may be a polyvinylidene fluoride (PVDF), an ethylene-tetrafluoroethylene copolymer (ETFE), an ETFE modified with the aid of a tercomponent such as propene, hexafluoropropene, vinyl fluoride or vinylidene fluoride (for example EFEP), an ethylene-chlorotrifluoroethylene copolymer (E-CTFE), a polychlorotrifluoroethylene (PCTFE), a chlorotrifluoroethylene-perfluorinated alkyl vinyl ether-tetrafluoroethylene copolymer (CPT), a tetrafluoroethylene-hexafluoropropene copolymer (FEP) or a tetrafluoroethylene-perfluorinated alkyl vinyl ether copolymer (PFA). It is also possible to use copolymers based on vinylidene fluoride which comprise up to 40% by weight of other monomers, examples being trifluoroethylene, chlorotrifluoroethylene, ethylene, propene and hexafluoropropene.

Polyphenyl sulphone (PPSU) may be obtained from Solvay Advanced Polymers under trade mark Radel®. It may be produced by nucleophilic substitution from 4,4'-dihydroxybiphenyl and 4,4'-dihydroxydiphenyl sulphone. Another particular suitable material may be a PPSU/fluoropolymer blend, for example a PPSU/PTFE blend.

The polyarylene ether ketone which may likewise be used comprises units of the formulae

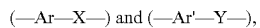

where Ar and Ar' are a divalent aromatic moiety, preferably 1,4-phenylene, 4,4'-biphenylene, or else 1,4-, 1,5- or 2,6-naphthylene. X is an electron-withdrawing group, preferably carbonyl or sulphonyl, while Y is another group, such as O, S, CH₂, isopropylidene or the like. At least 50%, preferably at least 70% and particularly preferably at least 80% of the groups X here are a carbonyl group, while at least 50%, preferably at least 70% and particularly preferably at least 80% of the groups Y are composed of oxygen.

In a preferred embodiment, 100% of the groups X may be composed of carbonyl groups and 100% of the groups Y may be composed of oxygen. In this embodiment, the polyarylene ether ketone can by way of example be a polyether ether ketone (PEEK; formula I), a polyether ketone (PEK; formula II), a polyether ketone ketone (PEKK; formula III) or a polyether ether ketone ketone (PEEKK; formula IV), but other arrangements of the carbonyl groups and oxygen groups may also be possible.

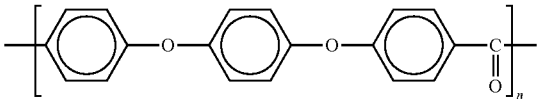

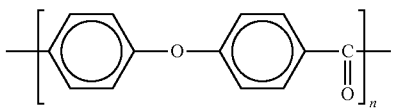

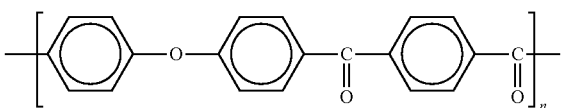

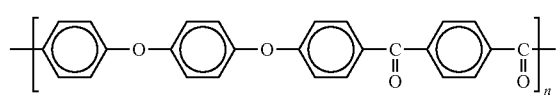

The polyarylene ether ketone may be semicrystalline, and this may be seen for example, in the DSC analysis where a crystallite melting point $T_m$ is observed, the order of magnitude of which is in most instances around 300° C. or thereabove.

The polyphenylene sulphide comprises units of the formula:

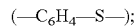

and it may preferably be composed of at least 50% by weight of such units, or at least 70% by weight or at least 90% by weight. The remaining units may be those stated above for the case of the polyarylene ether ketone, or tri- or tetra-functional branching units which result from the concomitant use of, for example, trichlorobenzene or tetrachlorobenzene during synthesis. Polyphenylene sulphide is available commercially in a wide variety of types or molding compositions.

In the case of the polyarylene ether ketone/polyphenylene sulphide blends, the two components may be present in any conceivable mixing ratio, and the range of constitution therefore continuously covers the entire range from pure polyarylene ether ketone to pure polyphenylene sulphide. The blend generally comprises at least 0.01% by weight of polyarylene ether ketone and, respectively, at least 0.01% by weight of polyphenylene sulphide.

The plastics molding compositions according to the invention may comprise conventional molding auxiliaries and additives, and also optionally other polymers. For example, the polyarylene ether ketone may comprise fluoropolymers, such as PFA (a copolymer of tetrafluoroethylene and perfluorinated vinyl methyl ether), polyimide, polyetherimide, LCP, such as liquid-crystalline polyesters, polysulphone, polyether sulphone, polyphenyl sulphone, polybenzimidazole (PBI) or other high-temperature-resistant polymers. As another example, the polyphenylene sulphide may comprise copolymers and terpolymers of ethylene with polar comonomers. The semiaromatic polyamide may comprise an aliphatic polyamide. The polyamide molding composition may optionally also comprise any of a hydrolysis stabilizer, a plasticizer and impact modifiers. The molding composition may moreover comprise a lubricant, such as molybdenum disulphide, hexagonal boron nitride or PTFE. The proportion of the main polymers, or else, in the preferred case, the proportion of olefinic polymer, polyamide, fluoropolymer, polyphenyl sulphone, polyarylene ether ketone, polyphenylene sulphide or polyarylene ether ketone/polyphenylene sulphide blend in the molding composition is at least 50% by weight, preferably at least 60% by weight, particularly preferably at least 70% by weight, with particular preference at least 80% by weight and very particularly preferably at least 90% by weight.

The electrical conductivity of the intermediate conductive layer may be obtained through addition of conductive materials such as carbon black, graphite powder and/or carbon nanotubes (CNTs) or graphite fibrils.

The wound tape may optionally also comprise further layers such as an adhesion promoter layer between any or all the layers of the wound tape.

The cross-sectional area of the tape may be of rectangular or rounded shape.

At the edges of the tape, the individual layers may have uncovered edges (FIG. 1), or the non-conducting exterior layers may be bonded to one another at that location (FIG. 2), in order to achieve the best possible electrical insulation in relation to the reinforcement layers.

Figure 2:
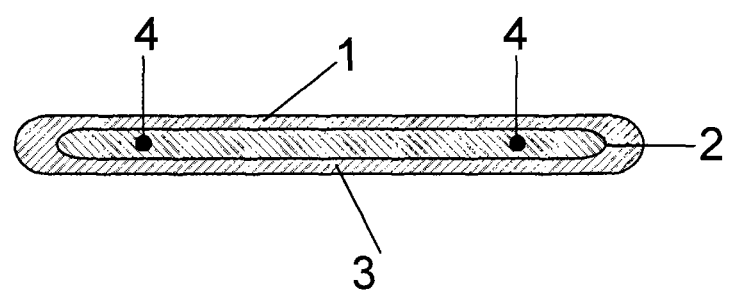
FIG. 2 shows another arrangement of the wound tape according to another embodiment of the invention.

In FIGS. 1 and 2 a first exterior layer is identified as (1) and a second exterior layer is identified as (3). An intermediate layer of an electrically conductive plastics molding composition is identified as (4). The edges of the tape are identified by (2).

FIG. 1 shows an arrangement of first (1) and second exterior layers (3), an interior layer (2) and two conductors (4). FIG. 2 shows an arrangement of first (1) and second exterior layers (3), an interior layer (2) and two conductors (4).

Figure 3:
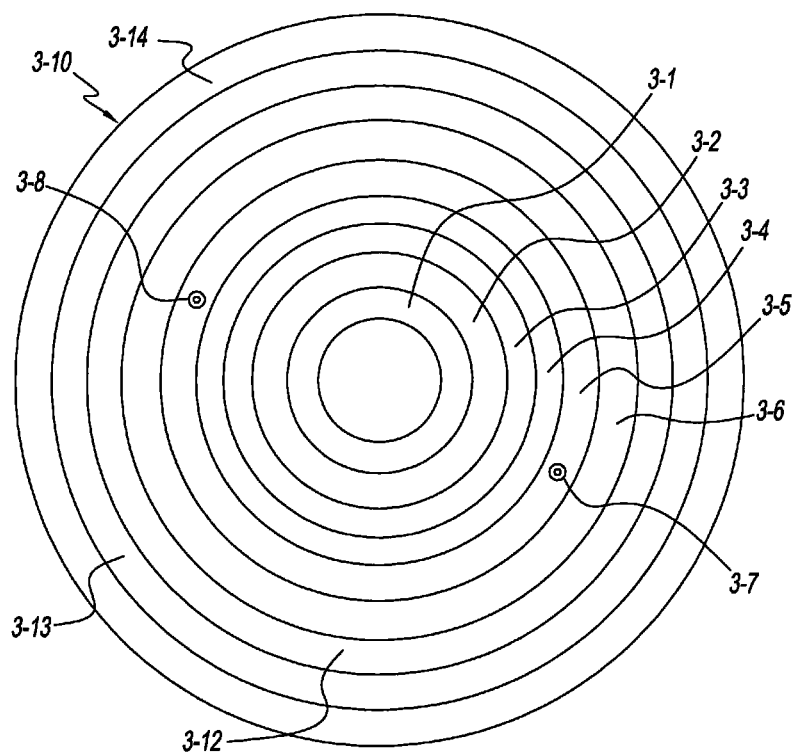
FIG. 3 shows an end view of a flexible pipe according to one embodiment of the invention.

FIG. 3 shows an end view of a flexible pipe (3-10) in an embodiment of the invention. The flexible pipe may include a plurality of layers: (3-1) an interior layer, (3-2) a layer formed from a wound tape, (3-3) a reinforcement layer, (3-4) a first exterior layer of a plastic molding composition, (3-5) an intermediate layer of an electrically conductive plastic molding composition, and (3-6) a second exterior layer of a plastic molding composition. The plastic molding composition may include two conductors, (3-7) and (3-8) in FIG. 3, that run the length of the pipe. At least one additional wound tape in combination with an additional reinforcement layer is shown as (3-12). At least one of a uni-directionally reinforced or textile-reinforced polymer layer is shown as (3-13). An externally situated thermal insulation layer is shown as (3-14).

Figure 4:
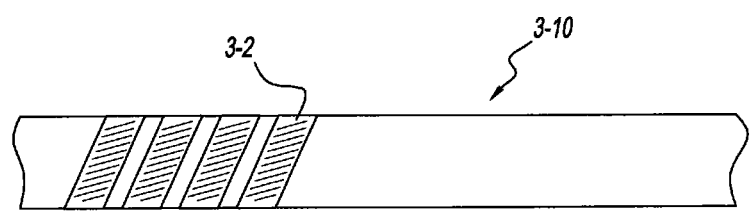
FIG. 4 shows a layer of tape wrapped around a pipe according to one embodiment of the invention.

FIG. 4 shows an embodiment in which a wound tape (3-2) is present on a flexible pipe (3-10).

Figure 5:
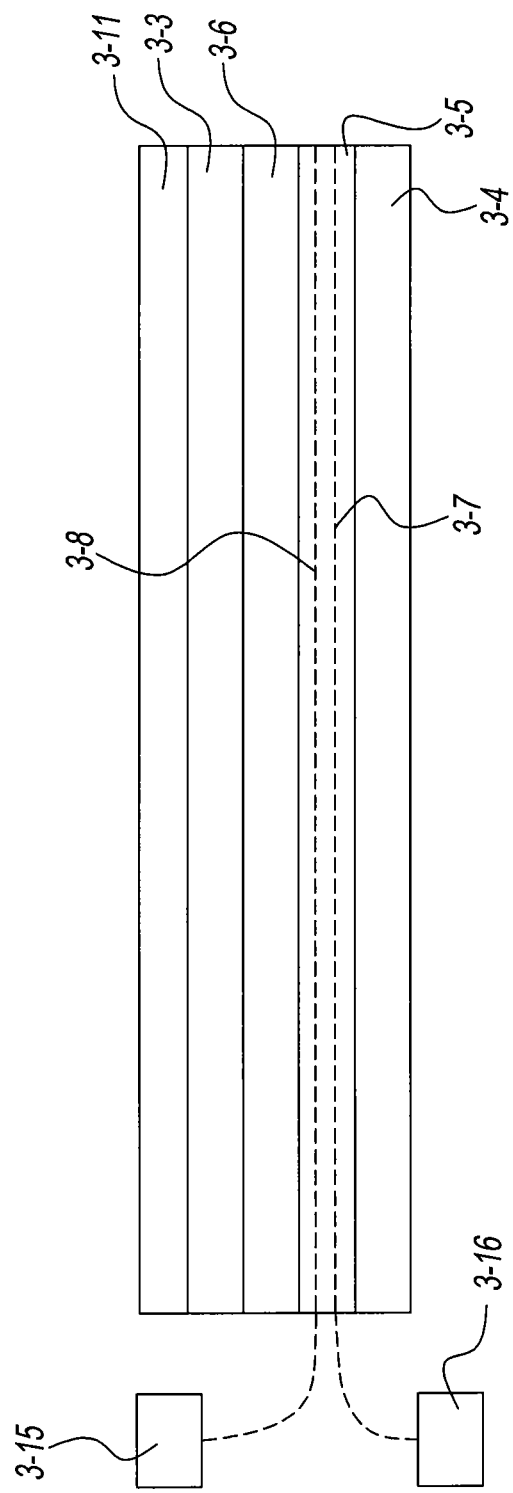
FIG. 5 shows a side view of an embodiment of the invention.

FIG. 5 shows a side view of a wound tape in which conductors (3-8) and (3-7) run the length of the tape without touching and are connected to sources of electrical current (3-15) and (3-16).

The metallic conductors embedded into the intermediate conductive layer may be connected to a source of electrical current. The potential difference then present between the individual conductors causes a current to flow through the electrically conductive intermediate layer, which therefore, functions as a resistance heating system. The current applied may be direct current or alternating current. In order to reduce the risk of failure, it may be advantageous to have more than two metallic conductors embedded into the intermediate conductive layer, for example three, four, five or six. The metallic conductors may be corrosion-resistant with regard to the conveyed fluid and its constituents.

The thickness of the tape may be in the range from 0.2 to 5 mm, preferably in the range from 0.4 to 5 mm and particularly preferably in the range from 0.5 to 4 mm. The thickness of the intermediate conductive layer is generally in the range from 0.1 to 3 mm, preferably in the range from 0.2 to 2.5 mm and particularly preferably in the range from 0.3 to 2 mm, while the thickness of each of the two exterior layers may be in the range from 0.05 to 1.5 mm, preferably in the range from 0.1 to 1 mm and particularly preferably in the range from 0.1 to 0.5 mm.

The width of the tape depends on the diameter of the pipe. Usual widths may be from about 20 mm to about 700 mm, preferably in the range from about 30 mm to about 500 mm and particularly preferably in the range from about 40 mm to about 300 mm.

The tape may be wound helically under tension onto a layer situated further inwards of the pipe, and this winding may be carried out either with edges abutted or with overlap. In the latter case, the overlapping locations of the tape may be fused after the winding process. This fusion may be achieved either by hot gas welding, by contact with a heating element, by means of a gas flame or by irradiation with electromagnetic radiation in the UV, visible or IR spectral range. In principle, spot welding may sufficient to fix the tape; however, preference may be given to continuous production of an uninterrupted welded seam. Optionally, the full surface of the tape may be welded in the overlapping regions. For the fusion process it is advantageous for the softening range of the molding composition in the exterior layers to be lower than the softening range of the molding composition in the conductive intermediate layer.

In order to reduce the risk of failure, it may be possible to wind, alongside one another or over one another, a plurality of tapes, each of which possesses its own electrical circuit. Moreover, it may be possible that the flexible pipe also possesses a plurality of such layers made of wound tape and separated from one another by a reinforcement layer.

The layer made of wound tape may also simultaneously function as an anti-wear layer. An anti-wear tape may be placed between the reinforcement layers made of steel, in order to prevent abrasion of the reinforcement layers. The primary result of this may abrasion of the tape. This abrasion must where appropriate be considered during design, in order to ensure that the electrically conductive intermediate layer is insulated over the entire lifetime of the flexible pipe. For the exterior layers, it may be therefore preferable to use molding compositions which have particularly good tribological properties.

When the molding composition of the intermediate conductive layer comprises, as electrically conductive additive, conductive carbon black, the heating system may utilize the positive temperature coefficient (PTC) effect. This effect provides an intrinsic safety feature, since it restricts temperature increase at constant voltage, because conductivity falls as the system becomes hotter. This may prevent thermal degradation of the pipe or of the medium to be transported.

According to the invention, it may also be possible that the tape is placed only in specific sections of the pipe. It may be possible to design the pipe to be conductive in the region where specific heating is required, and to introduce in other regions of the pipe where heating is not required, a conventional anti-wear tape or other non-heatable layer.

The flexible pipe may optionally further comprise, further layers, such as, for example unidirectionally reinforced or textile-reinforced polymer layers, and it may be possible in such embodiment to use carbon fibre reinforcement with good thermal conductivity, or an externally situated thermal insulation layer.

With the aid of the invention it may be possible to heat the pipe over its entire length or in selected sections, in order to prevent precipitation. Thermal degradation of the pipe system and of the transported medium may thus be avoided. Technical realization is simple, since no complicated additional technical parts are needed, and the structure per se of the pipe is not altered. The pipe of the invention may therefore be heated efficiently to the extent that it can also be used for conveying oil in cold regions, for example in the Arctic. Another possibility is use over long distances in deep-sea locations, where the conveyed medium is prevented from falling below the critical temperature discussed above.

The invention claimed is:

1. A flexible pipe comprising, in order from inside to outside:
an interior lining;
a wound tape, which comprises:
a first exterior layer of a plastics molding composition that is not electrically conductive;
an intermediate layer of an electrically conductive plastics molding composition;
a second exterior layer of a plastics molding composition that is not electrically conductive; and
at least one reinforcement layer;
wherein
a volume resistivity to IEC 60093 of the intermediate layer is in the range from $10^{-3}$ to $10^{10}$ Ωm, and
the intermediate layer comprises at least two metallic conductors embedded into the plastic molding composition along an entire length of the tape in such a way that, the two conductors do not touch one another.

2. The flexible pipe according to claim 1,
wherein the intermediate layer of the wound tape comprises at least one polymer selected from the group consisting of an olefinic polymer, a polyamide, a fluoropolymer, a polyethylene 2,6-naphthalate, a polybutylene 2,6-naphthalate, a polyphenyl sulphone, a polyarylene ether ketone, a polyphenylene sulphide, and a blend of a polyarylene ether ketone and a polyphenylene sulphide.

3. The flexible pipe according to claim 1, wherein
an interface between the wound tape and the at least one reinforcement layer is free of bonding.

4. The flexible pipe according to claim 1,
wherein the electrically conductive plastics molding composition of the intermediate layer comprises at least one conductive material selected from the group consisting of conductive carbon black, graphite powder and graphite fibrils.

5. The flexible pipe according to claim 1,
wherein
a thickness of the wound tape is from 0.2 to 5 mm,
a thickness of the intermediate layer is from 0.1 to 3 mm, and
a thickness of each of the two exterior layers is from 0.05 to 1.5 mm.

6. The flexible pipe according to claim 1,
wherein the at least one reinforcement layer comprises at least one selected from the group consisting of helically arranged steel wires, steel profiles and steel tapes.

7. The flexible pipe according to claim 4, wherein
the electrically conductive intermediate layer comprises conductive carbon black and
the heating system exhibits a positive temperature coefficient effect.

8. The flexible tape according to claim 2, wherein the electrically conductive intermediate layer comprises an olefinic polymer which is optionally impact-modified and the olefinic polymer is selected from the group consisting of polyethylene, a high-density polyethylene (HDPE), an isotactic polypropylene, a syndiotactic polypropylene, and a copolymer of polypropylene with ethylene or 1-butene.

9. The flexible pipe according to claim 2, wherein the electrically conductive intermediate layer comprises a polyamide, optionally impact-modified, and the polyamide is selected from the group consisting of PA610, PA88, PA8, PA612, PA810, PA108, PA9, PA613, PA614, PA812, PA128, PA1010, PA10, PA814, PA148, PA1012, PA11, PA1014, PA1212, PA12, PA66/6T, PA6/6T, PA6T/MPMDT (2-methylpentamethylenediamine), PA9T, PA10T, PA11T, PA12T, and PA14T.

10. The flexible pipe according to claim 2, wherein the electrically conductive intermediate layer comprises a semiaromatic polyamide, optionally impact-modified, and the semiaromatic polyamide is selected from the group consisting of PA66/6T, PA6/6T, PA6T/MPMDT (MPMD stands for 2-methylpentamethylenediamine), PA9T, PA10T, PA11T, PA12T, PA14T and also copolycondensates of these with an aliphatic diamine, an aliphatic dicarboxylic acid, an ω-aminocarboxylic acid or a lactam.

11. The flexible pipe according to claim 2, wherein the electrically conductive intermediate layer comprises a fluoropolymer and the fluoropolymer is selected from the group consisting of a polyvinylidene fluoride (PVDF), an ethylene-tetrafluoroethylene copolymer (ETFE), an ETFE modified with propene, hexafluoropropene, vinyl fluoride or vinylidene fluoride, an ethylene-chlorotrifluoroethylene copolymer (E-CTFE), a polychlorotrifluoroethylene (PCTFE), a chlorotrifluoroethylene-perfluorinated alkyl vinyl ether-tetrafluoroethylene copolymer (CPT), a tetrafluoroethylene-hexafluoropropene copolymer (FEP) and a tetrafluoroethylene-perfluorinated alkyl vinyl ether copolymer (PFA).

12. The flexible pipe according to claim 2, wherein the electrically conductive intermediate layer comprises a polyarylene ether ketone and the polyarylene ether ketone is selected from the group consisting of a polyether ether ketone (PEEK; formula I), a polyether ketone (PEK; formula II), a polyether ketone ketone (PEKK; formula III) and a polyether ether ketone ketone (PEEKK; formula IV):

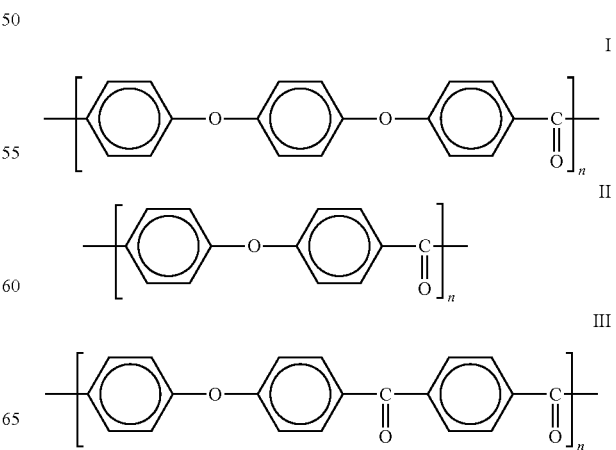

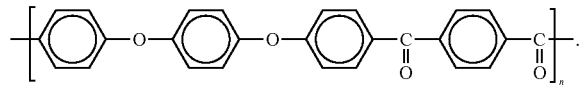

IV

13. The flexible pipe according to claim 1, wherein the individual layers of the wound tape have uncovered edges.

14. The flexible pipe according to claim 1, wherein the non-conducting exterior layers are bonded to one another at edges thereof.

15. The flexible pipe according to claim 1, further comprising at least one additional wound tape in combination with an additional reinforcement layer.

16. The flexible pipe according to claim 1, further comprising at least one of a unidirectionally reinforced or textile-reinforced polymer layer, optionally comprising carbon fiber reinforcement with good thermal conductivity, or an externally situated thermal insulation layer.

17. A method to convey crude oil, comprising:
    conveying the crude oil through the flexible pipe according to claim 1; and
    optionally conducting electrical current to the two metallic conductors to heat the crude oil.

18. The flexible pipe according to claim 1, further comprising at least one of a unidirectionally reinforced or textile-reinforced polymer layer, optionally comprising carbon fibre reinforcement with good thermal conductivity, or an externally situated thermal insulation layer.

19. A method for heating the flexible pipe according to claim 1, comprising:
    attaching the two metallic conductors to a source of electrical current; and
    applying an electrical current; whereupon a current flows through the electrically conductive intermediate layer and generates heat.

20. The method according to claim 19, wherein the electrical current is an AC or DC current.

* * * * *